(12) United States Patent
Granda et al.

(10) Patent No.: US 12,516,358 B2
(45) Date of Patent: Jan. 6, 2026

(54) TRIGLYCERIDES AND STRUCTURED LIPIDS FROM SHORT- AND MEDIUM-CHAIN FATTY ACIDS

(71) Applicant: BioVeritas, LLC, Bryan, TX (US)

(72) Inventors: Cesar Granda, College Station, TX (US); Jubo Zhang, College Station, TX (US)

(73) Assignee: BioVeritas, LLC, Bryan, TX (US)

( * ) Notice: Subject to any disclaimer, the term of this patent is extended or adjusted under 35 U.S.C. 154(b) by 0 days.

(21) Appl. No.: 18/634,373

(22) Filed: Apr. 12, 2024

(65) Prior Publication Data

US 2024/0352492 A1 Oct. 24, 2024

Related U.S. Application Data

(63) Continuation of application No. 17/978,710, filed on Nov. 1, 2022, now abandoned.
(Continued)

(51) Int. Cl.
*C12P 7/6454* (2022.01)
*C12N 9/16* (2006.01)
(Continued)

(52) U.S. Cl.
CPC .............. *C12P 7/6454* (2013.01); *C12N 9/16* (2013.01); *C12N 9/20* (2013.01); *C12P 7/6458* (2022.01);
(Continued)

(58) Field of Classification Search
CPC ......... C12P 7/6454; C12P 7/6458; C12P 7/40; C12P 7/52; C12P 7/54; C12P 39/00;
(Continued)

(56) References Cited

U.S. PATENT DOCUMENTS

| 4,528,197 A | 7/1985 | Blackburn |
|---|---|---|
| 5,312,836 A | 5/1994 | Bistrian |

(Continued)

FOREIGN PATENT DOCUMENTS

| CN | 104045556 A | 9/2014 |
|---|---|---|
| CN | 107652180 A | 2/2018 |

(Continued)

OTHER PUBLICATIONS

Zou et al., Enzymatic synthesis of structured lipids enriched with conjugated linoleic acid and butyric acid: strategy consideration and parameter optimization. 2020, Bioprocess Biosyst Eng 43, 273-282 (Year: 2020).*

(Continued)

*Primary Examiner* — Robert B Mondesi
*Assistant Examiner* — Naghmeh Nina Moazzami
(74) *Attorney, Agent, or Firm* — FOLEY & LARDNER LLP

(57) ABSTRACT

A method including reacting carboxylic acids obtained from fermentation and a carboxylic acid recovery step from said fermentation to produce short- or medium-chain triglycerides, wherein the reacting carboxylic acids comprises direct esterification with glycerol in the presence of a catalyst. Such method mentioned above wherein the produced short- or medium-chain triglycerides are further interesterified with an oil, butter, fat or other lipids in the presence of a catalyst to produce structured lipids. Yet another method comprising reacting carboxylic acids obtained from fermentation and a carboxylic acid recovery step from said fermentation to produce structured lipids, wherein reacting the carboxylic acids comprises transesterification with an oil, butter, fat or other lipids in the presence of a catalyst. The use of such short-chain triglycerides, medium-chain triglyc-
(Continued)

erides and structured lipids as nutritional additives, dietary supplements, or both.

14 Claims, 3 Drawing Sheets

Related U.S. Application Data

(60) Provisional application No. 63/300,770, filed on Jan. 19, 2022, provisional application No. 63/288,371, filed on Dec. 10, 2021, provisional application No. 63/274,428, filed on Nov. 1, 2021.

(51) Int. Cl.
  *C12N 9/20* (2006.01)
  *C12P 7/6458* (2022.01)

(52) U.S. Cl.
  CPC ............. *C12Y 301/01003* (2013.01); *C12Y 301/01023* (2013.01)

(58) Field of Classification Search
  CPC .... C12N 9/16; C12N 9/20; C12Y 301/01003; C12Y 301/01023; A23D 9/02; A23D 9/04; C11C 1/002; C11C 3/02; C11C 3/10; C07C 67/08
  See application file for complete search history.

(56) References Cited

U.S. PATENT DOCUMENTS

| | | | |
|---|---|---|---|
| 5,658,768 | A | 8/1997 | Quinlan |
| 6,369,252 | B1 | 4/2002 | Akoh |
| 9,447,016 | B2 | 9/2016 | Boulos et al. |
| 10,662,447 | B2 | 5/2020 | Ross et al. |
| 2019/0276861 | A1 | 9/2019 | Wang et al. |

FOREIGN PATENT DOCUMENTS

| | | |
|---|---|---|
| CN | 112538505 B | 10/2021 |
| EP | 2 057 904 A1 | 5/2009 |
| EP | 2 057 902 B1 | 4/2012 |
| WO | WO-90/12080 A1 | 10/1990 |
| WO | WO-91/16443 A1 | 10/1991 |
| WO | WO-2013/126990 A1 | 9/2013 |
| WO | WO-2016/007026 A1 | 1/2016 |
| WO | WO-2020/127182 A1 | 6/2020 |
| WO | WO-2020/234348 A1 | 11/2020 |

OTHER PUBLICATIONS

Amelia et al., Catalyzed Interesterification of Mixed Short & Medium Chain Fatty Acid Triacylglycerols as a Potential Dietary Food Lipid Source: Synthesis and Characterization, American Journal of Food Science and Technology, 2017, vol. 5, No. 6, 228-232 (Year: 2017).*
Abigor et al., Production of Cocoa Butter-like Fats by the Lipase-Catalyzed Interesterification of Palm Oil and Hydrogenated Soybean Oil, Journal of the American Oil Chemists' Society, vol. 80, No. 12, 1193-1196, 2003, 4 pages.
Agler et al., Chain elongation with reactor microbiomes: Upgrading dilute ethanol to medium-chain carboxylates, Energy & Environmental Science, vol. 5, 8189-8192, Jun. 2012, 4 pages.
Akoh, Structured Lipids, Food Lipids, Chemistry, Nutrition, and Biotechnology, 2nd Edition, Part V, Ch. 28, 895-926, 2002, 32 pages.
Cai et al., A two-step biodiesel production process from waste cooking oil via recycling crude glycerol esterification catalyzed by alkali catalyst, Fuel Processing Technology, vol. 137, 186-193, May 4, 2015, 8 pages.
Cook et al., Review article: Short-chain fatty acids in health and disease, Alimentary Pharmacology & Therapeutics, vol. 12, 499-507, 1998, 9 pages.
D'Amelia et al., Catalyzed Interesterification of Mixed Short & Medium Chain Fatty Acid Triacylglycerols as a Potential Dietary Food Lipid Source: Synthesis and Characterization, American Journal of Food Science and Technology, vol. 5, No. 6, 228-232, Oct. 2017, 5 pages.
Den Besten et al., The role of short-chain fatty acids in the interplay between diet, gut microbiota, and host energy metabolism, Journal of Lipid Research, vol. 54, 2325-2340, Sep. 2013, 16 pages.
Dijkstra, Chemical Interesterification, Article from AOAC Lipid Library, Aug. 2019, https://lipidlibrary.aocs.org/edible-oil-processing/chemical-interesterification, 7 pages.
English machine translation of CN 107652180A, 2018.
English translation of CN104045556A, 2014.
Farfan et al., Comparison of Chemical and Enzymatic Interesterification of Fully Hydrogenated Soybean Oil and Walnut Oil to Produce a Fat Base with Adequate Nutritional and Physical Characteristics, Food Technology & Biotechnology, vol. 53, 361-366, Sep. 2016, 6 pages.
Hoydonckx et al., Esterification and transesterification of renewable chemicals, Topics in Catalysis, vol. 27, Nos. 1-4, Feb. 2004, 14 pages.
International Search Report and Written Opinion for International Application No. PCT/US2022/048606, mailed Mar. 8, 2023, 14 pages.
Jawed et al., Engineered Production of Short Chain Fatty Acid in *Escherichia coli* Using Fatty Acid Synthesis Pathway, PLOS One, vol. 11, No. 7, Jul. 28, 2016, 20 pages.
Jensen et al., The Composition of Milk Fat, Journal of Dairy Science, vol. 74, 3228-3243, Sep. 1991, 16 pages.
Jiang et al., Butyric acid: Applications and recent advances in its bioproduction, Biotechnology Advances, vol. 36, 2101-2117, Sep. 26, 2018, 17 pages.
Jose et al., Tricaprin Isolated From Simarouba glauca Inhibits the Growth of Human Colorectal Carcinoma Cell Lines by Targeting Class-1 Histone Deacetylases, Frontiers in Pharmacology, vol. 9, Article 127, Mar. 12, 2018, 16 pages.
Karp et al., Post-Fermentation Recovery of Biobased Carboxylic Acids, ACS Sustainable Chemistry & Engineering, 6, 11, 15273-15283, Oct. 16, 2018, 11 pages.
Kaur et al., Facile Synthesis of Tributyrin Catalyzed by a Versatile Sulfated Iron Oxide: Reaction Pathway and Kinetic Evaluation, Industrial & Engineering Chemistry Research, vol. 55, 2534-2542, Feb. 11, 2016, 9 pages.
Kenealy et al., Production of caproic acid by cocultures of ruminal cellulolytic bacteria and Clostridium kluyveri grown on cellulose and ethanol, Applied Microbiology and Biotechnology, vol. 44, 507-513, 1995, 7 pages.
Klemann et al., Random Nature of Triacylglycerols Produced by the Catalyzed Interesterification of Short- and Long-Chain Fatty Acid Triglycerides, Journal of Agricultural and Food Chemistry, vol. 42, 442-446, Feb. 1, 1994, 5 pages.
Kong et al., Catalytic role of solid acid catalysts in glycerol acetylation for the production of bio- additives: a review, RSC Advances, vol. 6, 68885-68905, 2016, 21 pages.
Kong et al., Conversion of crude and pure glycerol into derivatives: A feasibility evaluation, Renewable and Sustainable Energy Reviews, vol. 63, 533-555, Sep. 2016, 23 pages.
Lopez-Garzon et al., Recovery of carboxylic acids produced by fermentation, Biotechnology Advances, vol. 32, 873-904, Apr. 18, 2014, 32 pages.
Moquin, Hydrolysis, Esterification and Glycerolysis of Lipids in Supercritical Carbon Dioxide Media, Ph.D. Thesis, Department of Agricultural, Food and Nutritional Science, University of Alberta, Spring 2008, 243 pages.
Mostafa et al., Production of mono-, di-, and triglycerides from waste fatty acids through esterification with glycerol, Advances in Bioscience and Biotechnology, vol. 4, 900-907, Sep. 2013, 8 pages.
New Jersey Dept. of Health, Sulphamic acid, 2009, available online at https://www.nj.gov/health/eoh/rtkweb/documents/fs/1770.pdf, 1 page.

(56) References Cited

OTHER PUBLICATIONS

Paez et al., Production of Structured Triglycerides Rich in n-3 Poly-unsaturated Fatty Acids by the Acidolysis of Cod Liver Oil and Caprylic Acid in a Packed Bed: Equilibrium and Kinetics, Chemical Engineering Sciences, vol. 57, 1237-1249, 2002, 13 pages.

Ploegmakers et al., Glycerides of butyric acid: A must for poultry, All About Feed, Feed Additives, Aug. 14, 2019, https://www.allaboutfeed.net/animal-feed/feed-additives/glycerides-of-butyric-acid-a-must-for-poultry/, 3 pages.

Rios-Covian et al., Intestinal Short Chain Fatty Acids and their Link with Diet and Human Health, Front Microbiology, vol. 7, Article 185, Feb. 17, 2016, 9 pages.

Rodriguez et al., Interesterification of Tallow and Sunflower Oil, Journal of the American Oil Chemists' Society, vol. 78, Issue 4, 431-436, Apr. 1, 2001, 6 pages.

Rousseau et al., Chemical Interesterification of Food Lipids: Theory and Practice, Food Lipids, Chemistry, Nutrition, and Biotechnology, 2nd Edition, Part II, Ch. 10, 319-351, 2002, 33 pages.

Sellappan et al., Synthesis of Structured Lipids by Transesterification of Trilinolein Catalyzed by Lipozyme IM60, Journal of Agricultural and Food Chemistry, vol. 49, No. 4, 2071-2076, Mar. 28, 2001, 6 pages.

Srigley et al., Current Analytical Techniques for Food Lipids, Food Safety: Innovative Analytical Tools for Safety Assessment, FDA papers, Ch. 3, 33-64, 2017, 32 pages.

Tan et al., The Role of Short-Chain Fatty Acids in Health and Disease, Advances in Immunology, vol. 121, Ch. 3, 91-119, 2014, 29 pages.

Teng et al., Quantification of Fatty Acids in Human, Cow, Buffalo, Goat, Yak, and Camel Milk Using an Improved One-Step GC-FID Method, Food Analytical Methods, vol. 10, 2881-2891, Mar. 7, 2017, 11 pages.

Willis et al., Enzymatic Interesterification, Food Lipids, Chemistry, Nutrition, and Biotechnology, 2nd Edition, Part V, Ch. 27, 857-893, 2002, 37 pages.

Younes et al., Scientific opinion on the re-evaluation of mono- and di-glycerides of fatty acids (E 471) as food additives, EFSA Journal, vol. 15, Issue 11, 5045, Nov. 10, 2017, 43 pages.

Heidor et al., The chemopreventive activity of butyrate-containing structured lipids in experimental rat hepatocarcinogenesis, Molecular Nutrition & Food Research, vol. 60, No. 2, pp. 420-429, Feb. 1, 2016, 10 pages.

Jadhav et al., Triglycerides of medium-chain fatty acids: a concise review, Journal of Food Science and Technology, vol. 60, No. 8, pp. 2143-2252, Jun. 22, 2022, 10 pages.

\* cited by examiner

TRIGLYCERIDES AND STRUCTURED LIPIDS FROM SHORT- AND MEDIUM-CHAIN FATTY ACIDS

CROSS-REFERENCE TO RELATED APPLICATIONS

This application is a continuation of U.S. Non-provisional patent application Ser. No. 17/978,710, filed on Nov. 1, 2022 which claims the benefit of and priority to U.S. Provisional Patent Application No. 63/274,428, filed on Nov. 1, 2021; U.S. Provisional Patent Application No. 63/288,371, filed on Dec. 10, 2021; and U.S. Provisional Patent Application No. 63/300,770, filed on Jan. 19, 2022; each of which are incorporated herein by reference in their entirety for any purpose whatsoever.

FIELD

The present technology relates to producing derivatives from fatty acids generated from fermentation. More particularly to the production of triglycerides and structured lipids from carboxylic acids, specifically the short- and medium-chain fatty acids generated from mixed-culture fermentation.

BACKGROUND

Triglycerides or triacylglycerols are glycerides with a backbone of glycerol and three fatty acids of any carbon length. Short-chain triglycerides (SCTs) are glycerides with backbone of glycerol and three short-chain aliphatic fatty acids ranging from C2 to C5 carbon length. Medium-chain triglycerides (MCTs) are glycerides with backbone of glycerol and three medium-chain aliphatic fatty acids ranging from C6 to C12 carbon length. Long-chain triglycerides (LCTs) are glycerides with backbone of glycerol and three long-chain fatty acids of C13 or longer. Structured lipids are natural or dietary fats or lipids, typically consisting mostly of LCTs that have been modified chemically or enzymatically by reacting and interchanging some of their original fatty acids in the glycerol backbone with short- and/or medium-chain fatty acids. C6 and C8 MCTs may be found and extracted commercially from palm kernel oil and coconut oil in relatively small quantities. MCTs are finding more and more applications in nutrient additives or dietary supplements (Bistrian U.S. Pat. No. 5,312,836; Blackburn U.S. Pat. No. 4,528,197). SCTs, especially those with butyric (C4) acid, are also having an increased demand because of their health benefits (den Besten et al. 2013, Kaur et al. 2016, Rios-Covian et al. 2016, Tan et al. 2014, Cook and Sellin 1998) and some MCTs, like those from C6, have even been claimed to have anti-cancer properties (Jose et al. 2018). SCTs can be synthesized from tri-esterification of short-chain fatty acids and glycerol and, similarly, MCTs can be synthesized from the tri-esterification of medium-chain fatty acids and glycerol (Kong 2016). However, pure SCTs, unlike MCTs and LCTs, tend to have a bitter or acrid taste. Thus, supplements for human or animal consumption of these triglycerides are typically provided in sealed capsules or encapsulations. C4 is found naturally in butter and milk fat (Teng et al. 2017. Jensen et al. 1991), typically in small quantities and never occupying all three positions in the same glycerol backbone, but combined with other longer chain acids to avoid the acrid taste issue. This provides the opportunity to have a product of acceptable taste with structured lipids, where the short-chain fatty acids are inserted or interchanged from the SCTs into natural fats, butters, or oils, and that contain LCTs or MCTs. In addition, the SCT-containing structured lipids can also be designed as non-dairy milk fat substitutes, to be added to non-dairy milk such as almond, coconut, pea, or rice milk. Structured lipids can also be made by inserting or interchanging medium-chain fatty acids from MCTs into LCTs, however, MCTs are not acrid/bitter by themselves; therefore, enriching or enhancing natural fats, butters or oils with MCTs does not require interesterification, but, under many circumstances, blending is adequate and sufficient. The predominant supply of short-chain fatty acids, which can then be used to produce SCTs or SCT-containing structured lipids, comes from petroleum. From a sustainability perspective and with an increasing demand of natural and clean-label products, the production of short-chain fatty acids from fermentation is preferred. There is also a growing demand for low-cost production of MCTs to replace current limited production from natural oil extraction, especially those containing C6 and C8.

Mixed-culture fermentations or anaerobic digestion use mixed organism consortia (a.k.a. mixed cultures) to digest a variety of biomass feedstocks, which produce mixed carboxylic acids when methanogenesis is inhibited or arrested. These carboxylic acids are short-chain fatty acids (SCFAs), such as acetic, propionic, butyric, iso-butyric, valeric and iso-valeric acids (C2-C5), and medium-chain fatty acids (MCFAs), such as caproic, heptanoic, caprylic acids (C6-C8), and even, although in much smaller quantities, nonanoic acid (C9). Further advancement of mixed culture fermentation would allow control of the chain length. Controlling certain conditions such as pH, temperature, and additives, allows for production of mainly SCFAs or for chain elongation to yield mostly MCFAs. While short- and medium-chain fatty acids themselves are useful chemicals with many application such as flavor & fragrances, cosmetics, antimicrobials, synthetic lubricants, plasticizers and among others, reacting these short- and medium-chain fatty acids with glycerol will produce SCTs and MCTs, respectively, and further also reacting them with oils, butters, and other fats will produce structured lipids. SCTs. MCTs and structured lipids have the potential to demand a higher value and price.

SUMMARY

Carboxylic acids such as acetic, propionic, butyric, iso-butyric, valeric, iso-valeric (carbon chain length ranging from C2 to C5, i.e., short-chain fatty acids) and caproic, heptanoic, caprylic and nonanoic (carbon chain length ranging from C6 to C9, i.e., medium-chain fatty acids) can be produced from mixed culture fermentation followed by acid recovery. Such acids can be employed to produce short- and medium-chain triglycerides (SCTs and MCTs) by tri-esterification of the fatty acids with glycerol using catalysts such as homogeneous or heterogeneous solid acid or base catalysts and enzymes. Structured lipids are attained by interchanging short- or medium-chain fatty acids with the long-chain fatty acids in natural oils, butters and fats using chemicals or enzymes as catalyst. When the short- and medium-chain fatty acids are directly substituted into the oils, butters, or fats, this process is knowns as acidolysis (transesterification). When SCTs and/or MCTs are reacted with the oils, butters, or fats to interchange the short- and medium-chain fatty acids from the SCTs and/or MCTs to the oil, butter or fat, this process is known as interesterification.

In some embodiments carboxylic acids obtained from fermentation and a carboxylic acid recovery step from said fermentation are reacted to produce short- or medium-chain triglycerides. In some embodiments, reacting carboxylic acids comprises direct esterification with glycerol in the presence of an acid catalyst. In other embodiments, reacting carboxylic acids comprises direct esterification with glycerol in the presence of a base catalyst. Yet in other embodiments, reacting carboxylic acids comprises direct esterification with glycerol in the presence of an enzyme as catalyst. In some embodiments, the fermentation mentioned above is a mixed-culture fermentation or anaerobic digestion. In some embodiments, after reacting the carboxylic acids a purification step is employed. The by-product streams from the reaction of the carboxylic acids and/or the purification step may be recycled to the fermentation or to the carboxylic acid recovery step. The carboxylic acids that produce short-chain triglycerides are short-chain fatty acids with a carbon length ranging from C2 to C5 or combinations thereof. The carboxylic acids that produce medium-chain triglycerides are medium-chain fatty acids with a carbon length ranging from C6 to C12 or combinations thereof.

Standard measurements such as ASTM D6866-20 provide the percent biobased carbon in a substance by measuring the relative amounts of $^{14}C$ isotope present in such substance. When fermentation is used to obtain carboxylic acids, the $^{14}C$ is introduced at current levels from growing plants and other foodstuffs, thus providing a very high % biobased carbon in such carboxylic acids. Although microorganisms can uptake some $CO_2$ from a carbonate buffer, which could come from mining and thus have very little $^{14}C$, the % biobased carbon would still be greater than 90%. Also, if all the buffering agent is recycled within the process or hydroxides are used as buffering agents, the fermentation-derived carboxylic acids are expected to have measurable amounts of $^{14}C$ at natural abundance thus giving >99% biobased carbon in the ASTM D6866-20 test. Therefore, in any embodiment herein, the carboxylic acid derived from a fermentation, and any material blended with or reacted with such carboxylic acid may have a % biobased carbon greater than 90%. In some embodiments, the carboxylic acid derived from fermentation has % biobased carbon greater than 99%. In any embodiments, disclosed herein, the biobased carbon may alternatively be defined with regard to the amount of $^{14}C$ present, where the amount is about 1 ppt (i.e. $10^{-12}$). In some embodiments, this is at least about 0.9 ppt.

In other embodiments, the produced short- or medium-chain triglycerides are further interesterified with an oil, butter, fat, other lipids, or other glycerol-containing fat in the presence of a catalyst, such as, but not limited to, an enzyme to produce structured lipids. Other embodiments comprise of reacting carboxylic acids obtained from fermentation and a carboxylic acid recovery step from said fermentation to produce structured lipids, wherein reacting the carboxylic acids comprises acidolysis (transesterifications) with an oil, butter, fat, other lipids, or other glycerol-containing fat in the presence of a catalyst, such as, but not limited to, an enzyme. In any embodiments herein, the enzyme promotes metathesis reactions. Accordingly, the term "metathesis enzyme" may be used to designate an enzyme that allows for the intertransfer of alkyl chains between triglyceride molecules. In some embodiments, the structured lipids from interesterification or transesterification are further purified to remove short-chain triglycerides to remove bitter taste. Further, this purification can be vacuum distillation, vacuum steam distillation, molecular distillation, or combinations thereof.

The short- and medium chain triglycerides may be used as nutritional additives, dietary supplements, or both. The structured lipids may also be used as nutritional additives, dietary supplements, or both.

The structured lipids may have a butyric acid content of more than 10% on a mole basis or more than 20% on a mole basis. The structured lipids may also have a short-chain fatty acid content of more than 30% on a mole basis.

DETAILED DESCRIPTION

Figure 1:
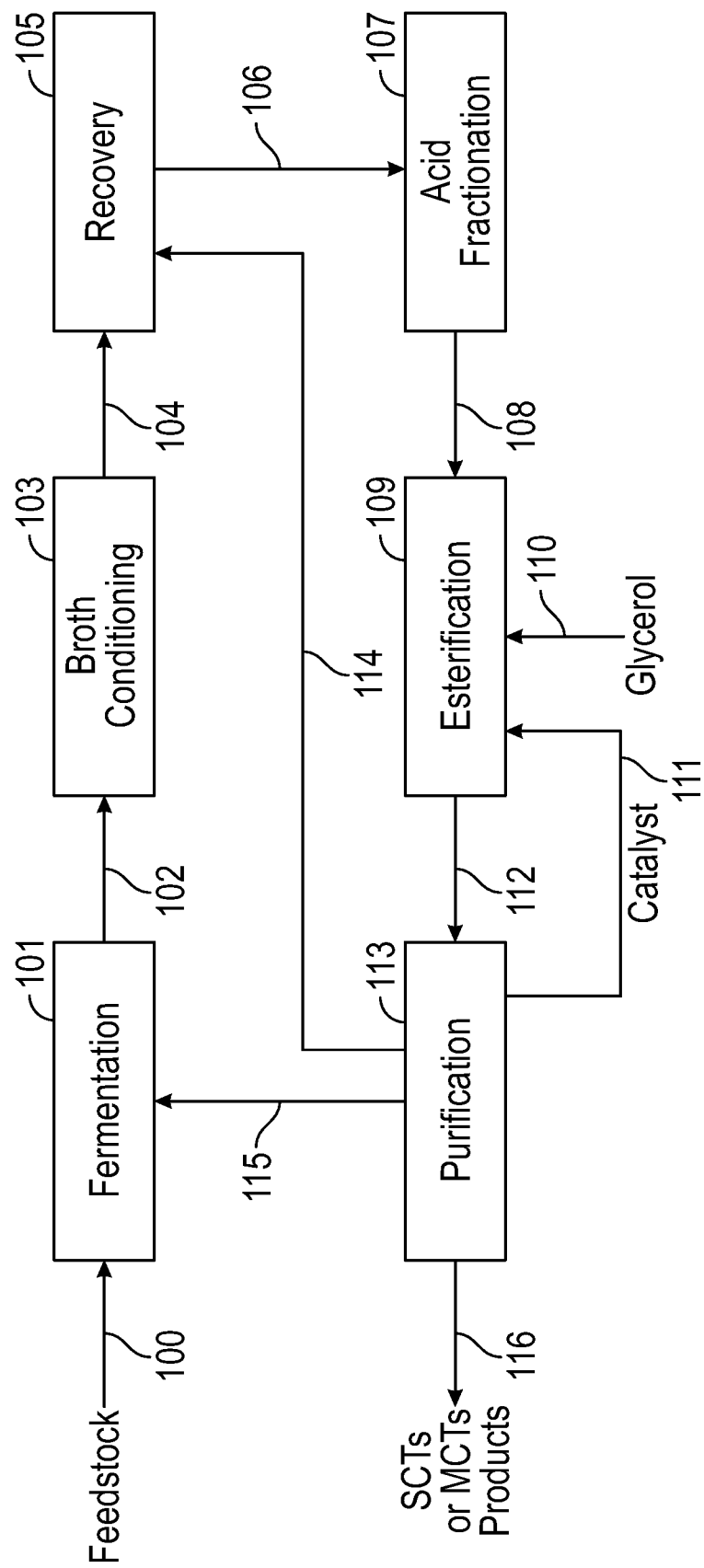
FIG. 1 illustrates a flow diagram of a process with integrated fermentation with direct esterification to produce SCTs or MCTs.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As utilized herein with respect to numerical ranges, the terms "approximately," "about," "substantially," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately." "about." "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Disclosed herein are systems, methods, and uses that pertain to converting carboxylic acid from fermentation to short- and medium-chain triglycerides and structured lipids.

It should be understood that, although example implementations of embodiments of the disclosure are described herein, the systems, methods, and uses of this disclosure may be implemented using any number of techniques, whether currently known or not. The present disclosure should in no way be limited to the example implementations, and techniques illustrated below.

It is also noted, and as would be apparent to one of skill in the art, "process streams" described herein need not be clean cut or pure. When referring to particular product streams herein, it should be understood that, although the primary product(s) may be described, other products may exist in the product stream. Thus, there may be quantities of the other compounds in such streams and/or other impurities.

The present invention features the production of triglycerides or structured lipids with the following structure:

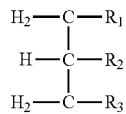

Short-chain triglycerides (SCTs) are triglycerides where $R_1$, $R_2$, and $R_3$ are short-chain fatty acids (SCFAs) of 2, 3, 4, or 5 carbon length (C2, C3, C4 and C5, respectively) or combinations thereof. Medium-chain triglycerides (MCTs) are triglycerides where $R_1$, $R_2$, and $R_3$ are medium-chain fatty acids (MCFAs) of 6, 7, 8, 9, 10, 11 or 12 carbon length (C6, C7, C8, C9, C10, C11 or C12, respectively) or combinations thereof. Although effort might be directed to maximize triglycerides, the final product may be a mixture of mostly triglycerides, but also diglycerides (two $R_1$, $R_2$, and $R_5$ are occupied by SCFAs or MCFAs, and the remaining one is occupied by an OH group) and monoglycerides (one of $R_1$, $R_2$ or $R_3$ is occupied by a SCFA or a MCFA, and the remaining two are occupied by OH groups), however, the product might be referred to as triglycerides (SCTs or MCTs) even though diglycerides and monoglycerides might also be present. Structured lipids are triglycerides that have been altered from their original form and where one or two of $R_1$, $R_2$, and $R_3$ are SCFAs of 2, 3, 4 or 5 carbon length or MCFAs of 6, 7, 8, 9, 10, 11 or 12 carbon length (C2, C3, C4, C5, C6, C7, C8, C9, C10, C11 and C12, respectively) and the remaining one or two of $R_1$, $R_2$, and $R_3$ not occupied by SCFAs or MCFAs are long-chain fatty acids of carbon length>12 (C13 and longer). All or part of the original triglycerides might have been altered to produce the structured lipids or the structured lipids can be further blended with the original unchanged triglycerides or with other triglycerides; therefore, not all the triglycerides in the product could be structured lipids; however, the mixture of altered structured lipids and unchanged triglycerides will be referred to as structured lipids.

Production of Short- and Medium-Chain Fatty Acids

Mixed-culture fermentation (also known anaerobic digestion) from renewable biomass resources is one of the most economically competitive methods to convert biomass materials to renewable chemicals and fuels. These microorganisms generally produce a mixture of carboxylic acids, which are short- and medium-chain fatty acids (SCFAs and MCFAs) ranging from acetic acid (C2) all the way to octanoic (C8) and even nonanoic acid (C9). These same microorganisms also produce the same carboxylic acids in the human and animal gastrointestinal tract (den Besten et al. 2013). Through controlled fermentation (temperature, pH, volatile solids loading rate, liquid residence time), selective recovery and with or without the addition of certain additives or reducing compounds like ethanol or hydrogen (Kene aly et al. 1995, Agler et al. 2012), the product profile of the carboxylic acid products can be adjusted to be in the short range of C2 and C3 or in the medium range of C4 to C9 carbon numbers or both. Typical temperatures that are used in mixed-culture fermentation range from 35 to 60° C. pH is important, as it will affect also the final profile, however, too low of a pH will also inhibit microorganisms. pH ranges from 5 to 9, but preferably between 6 and 7. In addition, another parameter to control is the volatile solids loading rate (VSLR, the rate at which volatile solids, which is a proxy for ash-free organic matter, is fed into the fermentation) and the liquid residence time (LRT). Longer residence times will select for slower growing microorganisms and vice versa shorter residence time will select for faster growing ones. Typical VSLRs range from 6 to 16 g volatile solids/(L-day), and preferably 8 to 23 g volatile solids/(L-day). The residence time, on the other hand can range from less than 1 day all the way to 32 days, but preferably 2 to 10 days. The carboxylic acids may be recovered from fermentation broth using several methods, such as acidification and extraction, followed by distillation (Ross and Granda U.S. Pat. No. 10,662,447) in a carboxylic acid recovery system (CARS). These carboxylic acids are high-value products in the chemical market for applications such as in food and feed additives, detergents, cosmetics, food additives, paints, lubricants, plasticizers and among others. However, because markets are limited, it is of great interest to find more opportunity for growth. Synthetic triglycerides and structured lipids containing short- and medium-chain fatty acids have potentially huge application as nutritional additives and dietary supplements for gut health in humans and animals (Kaur et al. 2016, Rios-Covian et al. 2016) and this is because, as mentioned, these same carboxylic acids (C2 through C8, but especially C2 through C4) are also produced by beneficial microorganisms in the gut (den Besten et al. 2013); therefore, getting these carboxylic acids to the gut, especially to the lower parts of the gastrointestinal tract, brings many health benefits (Tan et al 2014, Cook and Sellin 1998). Their delivery as glycerides ensures that the carboxylic acids are not degraded or absorbed along the way so that they may indeed reach the lower part of the gastrointestinal tract (Ploegmakers et al. 2019).

Production of Short- and Medium-Chain Triglycerides

A method to make glycerides is direct esterification of glycerol and carboxylic acids. For example, mono-, di-, and triglycerides can be produced through catalytic reaction of glycerol and corresponding fatty acids using a catalyst as shown below in Scheme 1.

Scheme 1. Direct esterification reaction of glycerol and carboxylic acids to produce mono-, di- and triglycerides

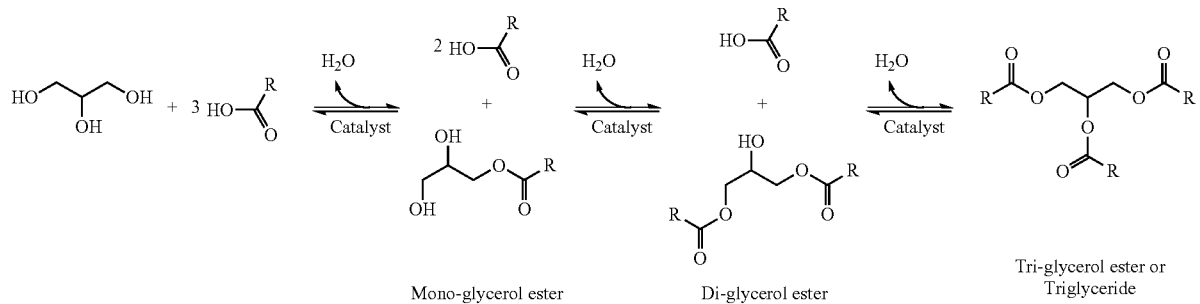

Mono-glycerol ester  Di-glycerol ester  Tri-glycerol ester or Triglyceride

The catalysts for esterification of the fatty acids with the glycerol can be homogeneous type or heterogeneous type. Homogeneous acids such as sulfuric or sulphonic acids are typically used for esterification of carboxylic acids and glycerol (Mostafa et al. 2013), but bases can also be employed (Younes et al. 2017). It could be estimated that approximately 80% of manufacturing processes use acid catalysts (Mostafa et al. 2013, Moquin 2008). Solid acids of either Bronsted type or Lewis type acids are reviewed for glycerol acetylation (Kong et al. 2016). Specifically, esterification of glycerol and fatty acids have been studied under reduced pressure with assistance of various metal chlorides and oxides as catalysts. For example, zirconia-supported hetero-polyacid catalyst (HSiW/ZrO$_2$) was reported to make glyceryl diacetate or triacetate. Highly acidic sulfonated zirconia catalyst (SO$_4^{2-}$/ZrO$_2$) was reported as more efficient for esterification of glycerol in excess of acetic acid. A triglyceride yield of 98% was achieved under optimized conditions of 130° C., 5 wt % catalyst, 1:8 M ratio of glycerol and acetic acid, and 8-hour reaction time (Kong et al. 2016). In another example, esterification of glycerol and fatty acids was reported using ZnCl$_2$ catalyst with up to 99% high purity triglycerides product (Mostafa et al 2013). And yet another example, methyl esters of medium-chain fatty acids were tri-esterified with glycerol using as catalyst methanesulfonic acid 70%, sodium methylate 30% and titanates of butylstannoic acid at dosage rate of 0.30% to 0.50% w/w of the total mixture (Lao et al. 2016). Enzymatic esterification of fatty or carboxylic acids has also been performed, such as using certain lipase enzymes, such as Novozyme lipase enzyme 435, but this is not effective with SCFAs, but it works well with MCFAs or larger (C6 and above).

Structured lipids may be formed through transesterification of oils, butters, or other fats with short- or medium-chain fatty acids (SCFAs or MCFAs). For example, short-chain triglycerides were reported to have at least one short-chain acid such as acetic acid, propionic acid, butyric acid, or valeric acid connected with a glycerol backbone along with some medium and/or long chain fatty acids, and they are normally manufactured through transesterification (Bistrian. U.S. Pat. No. 5,312,836). A method to produce structured lipids through transesterification was reported by Pacz et al. (2002) in which the structured triglycerides were generated by the acidolysis (transesterification) of cod liver oil and caprylic acid (C8). Either a batch reactor or an immobilized packed-bed reactor (Pacz et al. 2002, Willis and Marangoni 2002) can be used for catalytic synthesis where free fatty or carboxylic acids. SCFAs or MCFAs, are reacted with natural oils, butters or fats using enzymes such as lipase Lipozyme® TL IM (Pacz et al. 2002, Akoh 2002). Yet another method to produce structured lipids is interesterification, where rather than the free acids as in transesterification, the short- or medium-chain triglycerides (SCTs or MCTs) are reacted with oils, butters or fats using either chemicals such as sodium ethoxide or methoxide (Rousseau and Marangoni 2002, Klemann et al. 1994. Rodriguez et al. 2001, Dijkstra 2019, D'Amelia et al. 2017) or enzymatically (Quinlan U.S. Pat. No. 5,658,768, Willis and Marangoni 2002) using, for instance, Lipozyme® TL IM (Farfán et al. 2015, Abigor et al. 2003). In interesterification, the short-chain fatty acid branches from the SCTs or the medium-chain fatty acid branches from the MCTs replace some of the long-chain fatty acid branches naturally present in the oil, butter or fat, and thus also allowing some of the short- or medium-chain fatty acid branches present in the SCTs or MCTs, respectively, to be replaced or interchanged with the long-chain fatty acid branches from the oil, butter or fat.

Purification

During these conversions, heterogeneous (solid) catalysts, such as enzymes, may be removed by filtration, which allows recycling of the catalyst. Also, consideration about using the solid catalyst in a packed bed must also be given (Pacz et al. 2002, Willis and Marangoni 2002). The final triglyceride products will also require further purification to remove unreacted raw materials, such as unreacted fatty acids, monoglycerides, diglycerides, water and fatty acid salts (soaps formed when an alkali is used as a homogeneous catalyst) and other homogeneous catalyst. From interesterification, unreacted SCTs and MCTs may also need to be removed. Removal or purification of these liquid or dissolved species occurs through vacuum distillation, steam vacuum distillation or molecular distillation to maintain low temperatures. Many times, these removed residues can be recycled back to the esterification, transesterification or interesterification reaction. For instance, monoglycerides and diglycerides can be sent back to esterification to continue to react towards triglycerides. Unreacted SCTs or MCTs can be recycled back to interesterification. However, free fatty acids and water may not be recycled back to the esterification step, as the water must be removed during esterification and SCFAs and MCFAs form azeotropes with water. For MCFAs, lowering the temperature of the azeotrope will allow the MCFAs separation from the water, allowing recycling of some of the acid. However, SCFAs are more soluble or fully soluble in water and therefore cannot be recovered by simply lowering the temperature. The water containing the acids at a high concentration (>20 g/L) may be recycled to the CARS used to recover the acids from fermentation broth when integrated with fermentation as described above. If the acid concentration is low (<20 g/L), then the water should be recycled to the fermentation process instead of CARS. Any waste glycerides can also be recycled to the fermentation, where microorganisms are able to digest them and convert them back into carboxylic acids.

Further polishing may occur by bleaching the product with washes with, but not limited to, dilute phosphoric acid, with sodium bicarbonate solution to neutralize and remove any left-over unreacted acids and with water. Finally, the product may be passed through, for example, but not limited to, a bleaching clay or earth. If necessary, further impurities may be removed by passing the product through, for example, but not limited to, activated carbon. The by-product streams may also be considered for recycle to the fermentation or to CARS.

Mixed carboxylic acids (SCFAs and MCFAs) produced from fermentation and recovered with CARS or individual acids fractionated from the mixed acids recovered from CARS can be esterified with glycerol or transesterified with MCTs or LCTs or other natural oils, such as, but not limited to, coconut oil (virgin or just the medium-chain fatty acids), sunflower oil, avocado oil, olive oil, canola oil, soybean oil, palm oil, fish oil and shea butter, or the resulting SCTs and MCTs from esterification can be interesterified with MCTs, LCTs or other natural oils, such as, but not limited to, coconut oil (virgin or just the medium-chain fatty acids), sunflower oil, avocado oil, olive oil, canola oil, soybean oil, palm oil, fish oil and shea butter in a manner described above.

FIG. 1 illustrates the process of integrating fermentation, which produces carboxylic acids (short- and medium-chain fatty acids), with esterification to produce SCTs or MCTs as products.

With reference to FIG. 1, a biodegradable feedstock (100) such as, but not limited to, starch-based such as corn, wheat, oats, or cellulosic such as sugarcane bagasse, corn stover, straw, citrus peels is fed to a fermentation process (101), which can be mixed culture fermentation or anaerobic digestion, where microorganisms convert the feedstock into mixed carboxylic acids (short- and medium-chain fatty acids). The resulting fermentation broth (102) containing the acids or salts of the acids may undergo further conditioning (103) where it may be further cleaned up using filtration or centrifugation to remove solids, membranes (such as nanofiltration, ultrafiltration, microfiltration) to remove small, suspended solids and further concentration such as reverse osmosis or evaporation to remove water and other volatile impurities like ammonia. The resulting conditioned broth (104) is then sent to a carboxylic acid recovery system (CARS) (105) described above where the acids are recovered from the water. The recovered mixed carboxylic acids (short- and medium-chain acids) (106) may be optionally sent to acid fractionation (107) to purify them and produce individual acids. The separated and purified individual carboxylic acids (108) or the mixed carboxylic acids (106) prior to fractionation (107) may be sent to esterification (109) where these acids react with glycerol (110) in the presence of catalysts (111) as described above. The conditions may be run to where triglyceride production is maximized, while minimizing unreacted mono- and diglycerides. The resulting product stream from the esterification (112) is further sent to purification (113) where it undergoes clean up as described above. The catalyst (111) may also be recovered in the purification step (113) and if possible, it may be recycled to the esterification step (109). Other impurities, such as unreacted acids or their salts (114) may be recycled back to the carboxylic acid recovery system (CARS) (105). Yet other impurities, such as water (115), may be recycled back to the fermentation (101). Finally, purified SCTs or MCTs (116) are produced from the purification process as final products.

Figure 2:
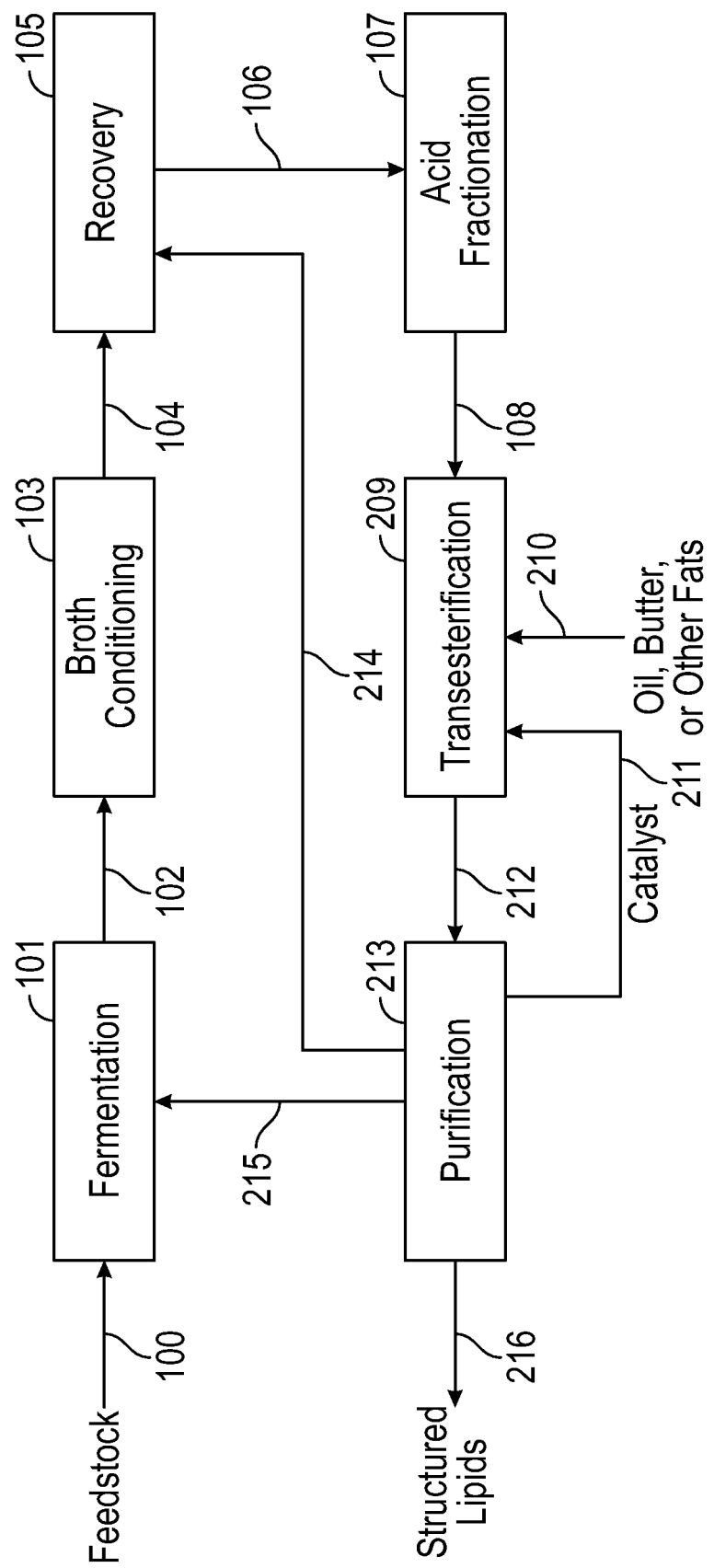
FIG. 2 illustrates a flow diagram of a process with integrated fermentation with transesterification to produce structured lipids

FIG. 2 illustrates the process of integrating fermentation, which produces carboxylic acids (short- and medium-chain fatty acids), with transesterification to produce structured lipids as products.

With reference to FIG. 2, a biodegradable feedstock (100), such as, but not limited to, starch-based such as corn, wheat, oats, or cellulosic such as, but not limited to, sugarcane bagasse, corn stover, straw, citrus peels, is fed to a fermentation process (101), which can be mixed culture fermentation or anaerobic digestion, where microorganisms convert the feedstock into mixed carboxylic acids (short- and medium-chain fatty acids). The resulting fermentation broth (102) containing the acids or salts of the acids may undergo further conditioning (103) where it may be further cleaned up using filtration or centrifugation to remove solids, membranes (such as nanofiltration, ultrafiltration, microfiltration) to remove small, suspended solids and further concentration such as reverse osmosis or evaporation to remove water and other volatile impurities like ammonia. The resulting conditioned broth (104) is then sent to a carboxylic acid recovery system (CARS) (105) described above where the acids are recovered from the water. The recovered mixed carboxylic acids (short- and medium-chain acids) (106) may be optionally sent to acid fractionation (107) to purify them and produce individual acids. The separated and purified individual carboxylic acids (108) or the mixed carboxylic acids (106) prior to fractionation (107) may be sent to transesterification (209), where these acids react with an oil, butter, or other fats, including other medium-chain fatty acids (210) in the presence of catalysts (211) as described above. The resulting product stream from the transesterification (212) is further sent to purification (213) where it undergoes clean up as described above. The catalyst (211) may also be recovered in the purification step (213) and if possible, it may be recycled to the transesterification step (209). Other impurities, such as unreacted acids (214) may be recycled back to the carboxylic acid recovery system (CARS) (105). Yet other impurities, such as water (215), may be recycled back to the fermentation (101). Finally, purified structured lipids (216) are produced from the purification process as final products.

Figure 3:
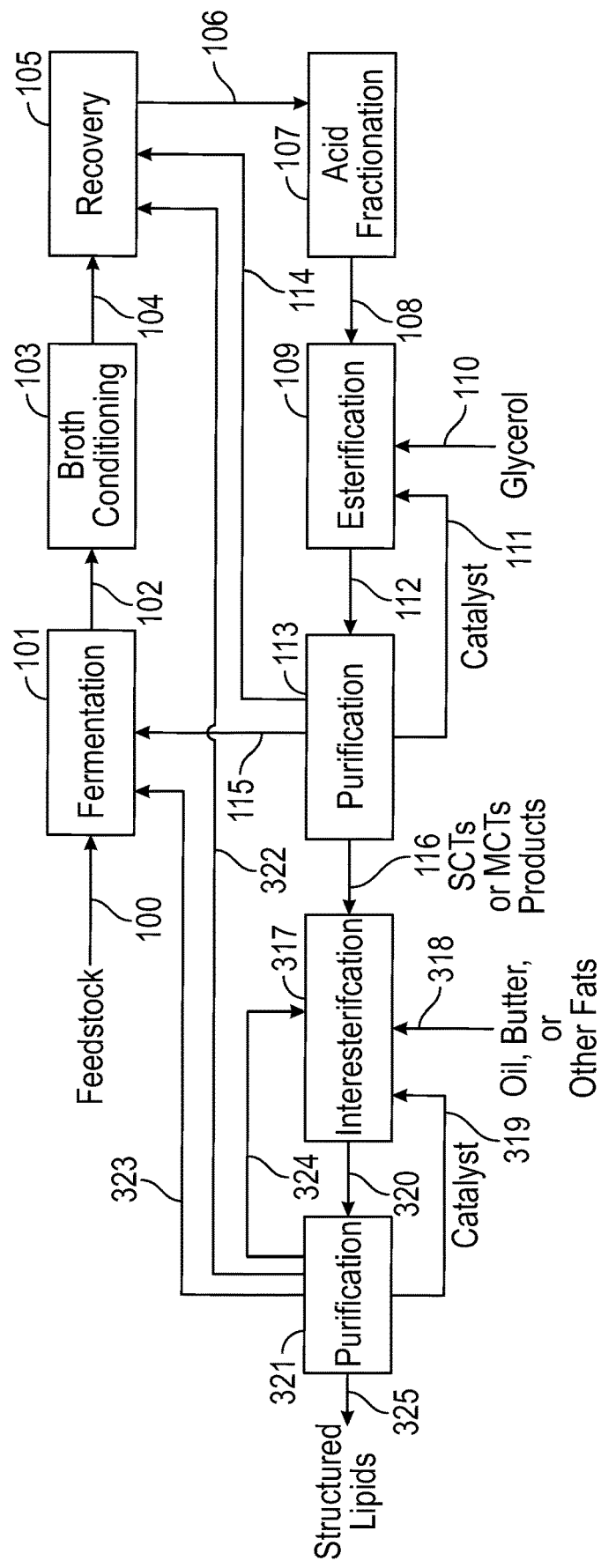
FIG. 3 illustrates a flow diagram of a process with integrated of fermentation with direct esterification to produce SCTs or MCTs and further interesterification of the SCTs and MCTs to produce structured lipids

FIG. 3 illustrates a similar process of integrating fermentation, which produces carboxylic acids (short- and medium-chain fatty acids), with esterification to produce SCTs or MCTs as those of FIG. 1, but with further conversion of the produced SCTs or MCTs to structured lipids using an interesterification process.

With reference to FIG. 3, a biodegradable feedstock (100) such as, but not limited to, starch-based such as corn, wheat, oats, or cellulosic such as sugarcane bagasse, corn stover, straw, citrus peels is fed to a fermentation process (101), which can be mixed culture fermentation or anaerobic digestion, where microorganisms convert the feedstock into mixed carboxylic acids (short- and medium-chain fatty acids). The resulting fermentation broth (102) containing the acids or salts of the acids may undergo further conditioning (103) where it may be further cleaned up using filtration or centrifugation to remove solids, membranes (such as nanofiltration, ultrafiltration, microfiltration) to remove small, suspended solids and further concentration such as reverse osmosis or evaporation to remove water and other volatile impurities like ammonia. The resulting conditioned broth (104) is then sent to a carboxylic acid recovery system (CARS) (105) described above where the acids are recovered from the water. The recovered mixed carboxylic acids (short- and medium-chain acids) (106) may be optionally sent to acid fractionation (107) to purify them and produce individual acids. The separated and purified individual carboxylic acids (108) or the mixed carboxylic acids (106) prior to fractionation (107) may be sent to esterification (109) where these acids react with glycerol (110) in the presence of catalysts (111) as described above. The conditions may be run to where triglyceride production is maximized, while minimizing unreacted mono- and diglycerides. The resulting product stream from the esterification (112) is further sent to purification (113) where it undergoes clean up as described above. The catalyst (111) may also be recovered in the purification step (113) and if possible, it may be recycled to the esterification step (109). Other impurities, such as unreacted acids or their salts (114) may be recycled back to the carboxylic acid recovery system (CARS) (105). Yet other impurities, such as water (115), may be recycled back to the fermentation (101). Finally, purified SCTs or MCTs (116) are produced from the purification process.

Further, in FIG. 3, after the integration of fermentation, carboxylic acid recovery, optionally fractionation and esterification, which yields purified SCTs or MCTs (116), these purified MCTs and MCTs (116) may be sent to interesterification (317) where these acids react with oil, butter or other fats (318) in the presence of catalysts (319) as described above. The resulting product stream from the interesterification (320) is further sent to purification (321) where it undergoes clean up as described above. The catalyst (319) may also be recovered in the purification step (321), and if possible, it may be recycled to the interesterification step (317), or it can be placed in a packed bed for the reaction to occur. Other impurities, such as unreacted acids (322) may be recycled back to the carboxylic acid recovery system (CARS) (105). Yet other impurities, such as water, or impure triglycerides (323), may be recycled back to the fermentation (101). If pure unreacted short- or medium-chain triglycerides are recovered, these can be recycled (324) back to the interesterification step (317). Finally, purified structured lipids (325) are produced from the purification process.

The present invention, thus generally described, will be understood more readily by reference to the following examples, which are provided by way of illustration and are not intended to be limiting of the present invention.

Example I 100 g glycerol and 400 g butyric acid (C4) were mixed with 10 g sodium hydroxide as homogeneous catalyst in a reactive distillation system for removing water as it is formed during the esterification. The esterification was carried out in 2 steps: First, it was run at a temperature around 120° C. to make mostly monoglycerides and diglyceride for 5 hrs. Then temperature was increased to 180-200° C. for 10 hr to make mostly triglycerides. Unreacted butyric acid and water was removed by vacuum distillation. The crude product was further cleaned up with a phosphoric acid water wash, then sodium bicarbonate water wash, and finally a DI water wash. The product was then passed through a bleaching clay. About 400 g of an SCT, namely glyceryl tributyrate (C4 triglyceride), also known as tributyrin (>95% triglyceride, with the rest being diglyceride) was made.

Example II

Commercial MCT oil extracted from coconut oil is produced by separating natural MCTs from conventional coconut oil by distillation. This commercial product is used as a reactant in this example. About 320 g commercial MCT oil extracted from coconut oil and 80 g of tributyrin generated as shown in Example I, were mixed with 20 g Lipozyme® TL IM enzyme (from Novozymes A/S). Interesterification at 70° C. was run for 2-3 hrs. The resulting mix was filtered to remove the enzyme, and the crude product was run through steam vacuum distillation to remove unreacted tributyrin. Tributyrin has a bitter taste. To produce a good tasting product, it is important to remove unreacted tributyrin. About 175 g butyrate-enhanced MCT oil from coconut was made using this process. Table 1 shows the composition of this product expressed on a free-fatty-acid basis compared to conventional virgin coconut oil. The SCTs in the product are about 19% mol basis (all of it C4) on a free-fatty-acid basis, whereas LCTs is only 7.3% mole basis. In contrast, conventional virgin coconut has no SCTs and LCTs are about 30% mol basis.

TABLE 1

Fatty acid composition of butyrate-enhanced MCT oil from coconut compared to virgin coconut oil

| Fatty Acid Basis | MW | VIRGIN COCONUT OIL | | C4-ENHANCED MCT OIL FROM COCONUT | |
|---|---|---|---|---|---|
| | | % Weight | % mole | % Weight | % mole |
| C2 (acetic) | 60.05 | 0.0% | 0.0% | 0.0% | 0.0% |
| C3 (propionic) | 74.08 | 0.0% | 0.0% | 0.0% | 0.0% |
| IC4 (isobutyric) | 88.10 | 0.0% | 0.0% | 0.0% | 0.0% |
| C4 (butyric) | 88.10 | 0.0% | 0.0% | 10.9% | 19.0% |
| IC5 (isovaleric) | 102.13 | 0.0% | 0.0% | 0.0% | 0.0% |
| C5 (valeric) | 102.13 | 0.0% | 0.0% | 0.0% | 0.0% |
| C6 (caproic) | 116.16 | 0.7% | 1.3% | 0.0% | 0.0% |
| C7 (heptanoic) | 130.18 | 0.0% | 0.0% | 0.0% | 0.0% |
| C8 (caprylic) | 144.21 | 8.5% | 12.1% | 34.7% | 37.2% |
| C10 (capric) | 172.26 | 6.5% | 7.6% | 28.1% | 25.2% |
| C12 (lauric) | 200.32 | 48.4% | 49.2% | 14.6% | 11.3% |
| C14 (myristic) | 228.37 | 19.5% | 17.4% | 5.9% | 4.0% |

TABLE 1-continued

Fatty acid composition of butyrate-enhanced MCT oil from coconut compared to virgin coconut oil

| Fatty Acid Basis | MW | VIRGIN COCONUT OIL | | C4-ENHANCED MCT OIL FROM COCONUT | |
|---|---|---|---|---|---|
| | | % Weight | % mole | % Weight | % mole |
| C16 (palmitic) | 256.43 | 8.2% | 6.5% | 2.7% | 1.7% |
| C18o (oleoic) | 282.47 | 4.8% | 3.5% | 1.8% | 1.0% |
| C18l (linoleic) | 280.45 | 0.6% | 0.5% | 0.4% | 0.2% |
| C18s (stearic) | 284.48 | 2.7% | 2.0% | 0.8% | 0.4% |
| Total C2-C18 | TOTAL | 100.0% | 100.0% | 100.0% | 100.0% |
| Total C2-C8 | TOTAL | 9.3% | 13.3% | 45.6% | 56.2% |
| Fatty Acid Average MW | | 203.7 | | 154.4 | |
| Total SCTs (C2-C5) | TOTAL | 0.0% | 1.3% | 10.9% | 19.0% |
| Total MCTs (C6-C12) | TOTAL | 64.1% | 70.3% | 77.5% | 73.7% |
| Total LCTs (>C14) | TOTAL | 35.9% | 29.8% | 11.7% | 7.3% |

ANALYTICAL NOTE:
The data on this table was generated using a technique where all the triglycerides are first fully derivatized into their corresponding fatty acid methyl esters (FAMEs), and then such esters are analyzed and measured in a calibrated GC-MS. The measured FAMEs concentrations are then stoichiometrically converted to a fatty acid basis (Srigley and Mossoba 2017; Teng et al. 2017)

Example III

In the same spirit of the product in EXAMPLE II, which was MCTs (C8, C10 and C12) from coconut oil and later enhanced with one SCT (tributyrin) by interesterification, this next example illustrates how to enhance conventional coconut oil, which already contains some C8, C10 and C12 MCTs, with both C6 and C4 glycerides. As mentioned previously, when taste is a concern, the SCTs need to be interesterified, but the MCTs may be blended; therefore, we follow these three steps:

1. In a reaction vessel, 700 g of coconut oil and 330 g of tributyrin prepared in the manner described in EXAMPLE I were mixed with 50 g Lipozyme® TL IM (from Novozymes A/S), and interesterification was run for 2-3 hours at 70° C. After filtration to remove used enzyme, the crude product was run through molecular distillation to remove unreacted tributyrin and avoid the acrid taste. This step made about 900 grams of high C4 concentration (~35 mol %) coconut oil.

2. In a reactive distillation set-up, 140 g glycerol and 750 g hexanoic (C6) acid mixed with 5 g sodium hydroxide (NaOH) catalyst were mixed and run under vacuum (7-8 in Hg Vac) at temperatures between 140° C. and 170° C. to remove reaction water. Then further vacuum distillation was run to remove unreacted C6 acid. The crude product was further cleaned in a manner similar to EXAMPLE I, to produce about 500 grams of an MCT, glyceryl tri-caproate (C6 triglyceride) also known as tricaproin.

TABLE 2

Fatty acid composition of butyrate- and caproate-enriched coconut oil compared to virgin coconut oil.

| Fatty Acid Basis | MW | VIRGIN COCONUT OIL | | HIGH C4-C6 COCONUT OIL | |
|---|---|---|---|---|---|
| | | % Weight | % mole | % Weight | % mole |
| C4 (butyric) | 88.10 | 0.0% | 0.0% | 15.5% | 27.9% |
| C6 (caproic) | 116.16 | 0.8% | 1.4% | 11.6% | 15.9% |
| C8 (caprylic) | 144.21 | 9.8% | 13.9% | 5.5% | 6.0% |
| C10 (capric) | 172.26 | 7.6% | 8.9% | 4.4% | 4.0% |
| C12 (lauric) | 200.32 | 43.7% | 44.3% | 36.0% | 28.5% |
| C14 (myristic) | 228.37 | 20.9% | 18.6% | 15.5% | 10.8% |
| C16 (palmitic) | 256.43 | 8.6% | 6.8% | 6.2% | 3.8% |
| C18o (oleoic) | 282.47 | 5.0% | 3.6% | 2.9% | 1.6% |
| C18l (linoleic) | 280.45 | 0.7% | 0.5% | 0.4% | 0.2% |
| C18s (stearic) | 284.48 | 3.0% | 2.1% | 2.1% | 1.2% |
| Total C2-C18 | TOTAL | 100.0% | 100.0% | 100.0% | 100.0% |
| Total C2-C8 | TOTAL | 10.6% | 15.3% | 32.5% | 49.8% |
| Fatty Acid Average MW | | 203.0 | | 158.9 | |
| Total SCTs (C2-C5) | TOTAL | 0.0% | 0.0% | 15.5% | 27.9% |
| Total MCTs (C6-C12) | TOTAL | 61.9% | 68.4% | 57.4% | 54.5% |
| Total LCTs (>C14) | TOTAL | 38.1% | 31.6% | 27.1% | 17.7% |

ANALYTICAL NOTE: Please see analytical note in Table 1.

3. Butyrate-enhanced coconut oil from Step 1 and tricaproin from Step 2 were blended to produce a high C4 (28 mol %) and high C6 (16 mol %) coconut oil, which has the composition shown in Table 2 on a free-fatty-acid basis. MCTs, such as tricaproin, are not acrid/bitter by themselves; therefore, enriching or enhancing natural oils or other lipids with MCTs does not require interesterification, but, under many circumstances, as in this example, blending is adequate and sufficient. Table 2 also shows the composition on a free-fatty-acid basis of virgin coconut oil for comparison purposes. What has been accomplished here is to have a natural oil (coconut), enhanced with C4 triglycerides, which is a beneficial SCT found in milk, and C6 triglycerides, which is typically found in coconut oil but in very small quantities.

TABLE 3

Fatty acid composition of SCT/MCT-enhanced coconut oil compared to virgin coconut oil.

| Fatty Acid Basis | MW | VIRGIN COCONUT OIL % Weight | VIRGIN COCONUT OIL % mole | SCT/MCT-ENHANCED COCONUT OIL % Weight | SCT/MCT-ENHANCED COCONUT OIL % mole |
|---|---|---|---|---|---|
| C2 (acetic) | 60.05 | 0.0% | 0.0% | 2.0% | 4.9% |
| C3 (propionic) | 74.08 | 0.0% | 0.0% | 2.4% | 4.8% |
| IC4 (isobutyric) | 88.10 | 0.0% | 0.0% | 0.4% | 0.7% |
| C4 (butyric) | 88.10 | 0.0% | 0.0% | 12.3% | 20.5% |
| IC5 (isovaleric) | 102.13 | 0.0% | 0.0% | 0.6% | 0.9% |
| C5 (valeric) | 102.13 | 0.0% | 0.0% | 3.7% | 5.3% |
| C6 (caproic) | 116.16 | 0.7% | 1.3% | 7.9% | 10.0% |
| C7 (heptanoic) | 130.18 | 0.0% | 0.0% | 1.1% | 1.2% |
| C8 (caprylic) | 144.21 | 8.5% | 12.1% | 11.0% | 11.2% |
| C10 (capric) | 172.26 | 6.5% | 7.6% | 4.2% | 3.5% |
| C12 (lauric) | 200.32 | 48.4% | 49.2% | 32.6% | 23.9% |
| C14 (myristic) | 228.37 | 19.5% | 17.4% | 12.4% | 8.0% |
| C16 (palmitic) | 256.43 | 8.2% | 6.5% | 4.9% | 2.8% |
| C18o (oleoic) | 282.47 | 4.8% | 3.5% | 2.6% | 1.3% |
| C18l (linoleic) | 280.45 | 0.6% | 0.5% | 0.3% | 0.2% |
| C18s (stearic) | 284.48 | 2.7% | 2.0% | 1.5% | 0.8% |
| Total C2-C18 | TOTAL | 100.0% | 100.0% | 100.0% | 100.0% |
| Total C2-C8 | TOTAL | 9.3% | 13.3% | 41.5% | 59.5% |
| Fatty Acid Average MW | | 203.7 | | 146.6 | |
| Total SCTs (C2-C5) | TOTAL | 0.0% | 0.0% | 21.5% | 37.1% |
| Total MCTs (C6-C12) | TOTAL | 64.1% | 70.3% | 56.8% | 49.8% |
| Total LCTs (>C14) | TOTAL | 35.9% | 29.8% | 21.7% | 13.1% |

ANALYTICAL NOTE: Please see analytical note in Table 1.

Example IV

Using a similar esterification procedure as the one used for preparing tributyrin in EXAMPLE I, SCTs were made from a fraction that contained a mixture of C2, C3, C4 and C5 fatty acids (SCFAs). Then, again also using a similar esterification procedure as tributyrin preparation in EXAMPLE I, MCTs were made using a mixture that contained C6, C7 and C8 fatty acids (MCFAs). These two products, the SCTs and the MCTs produced from esterification of SCFAs and MCFAs, respectively, were blended resulting in a distribution of about 6% C2, 7% C3, 37% C4, 14% C5, 20% C6, 3% C7 and 13% C8 by mass expressed on a free-fatty-acid basis. Then, 250 g of this SCT/MCT blend and 250 g of conventional coconut oil was mixed with 50 g Lipozyme® TL IM (from Novozymes A/S) to run interesterification for 2-3 hours at 70° C. After filtration of the used enzyme, the crude product was run through steam vacuum distillation to remove any unreacted SCTs, which cause bitter taste. About 400 g of this SCT/MCT-enhanced coconut oil was made. Table 3 shows the composition of this SCT/MCT-enhanced coconut oil expressed on a free-fatty-acid basis together with the composition of conventional virgin coconut oil, also expressed on a free-fatty-acid basis, for comparison. The composition shows a large proportion of the more desirable C2-C5 SCTs (~37 mol %), without the bitter taste, ~50 mol % of C6-C12 MCTs and only 13 mol % LCTs compared to 0 mol % SCTs and ~30 mol % LCTs found in conventional coconut oil.

This invention claims the integration of fermentation, which produced carboxylic acids which range from acetic acid (C2) to nonanoic acid (C9) (i.e., short- and medium-chain fatty acids) with recovery of such carboxylic acids using a carboxylic acid recovery system (CARS), which efficiently recovers and purifies the acids from the effluent from the fermentation, and with further conversion of such acids to short- or medium-chain triglycerides or structured lipids.

Embodiments of the fermentation, also known as anaerobic digestion, typically use a mixed-culture of microorganisms, which ferment biodegradable feedstocks, which may be starch-rich, such as, but not limited to, corn-, oat- or wheat-based feedstocks, or cellulosic such as, but not limited to, sugarcane bagasse, corn stover, straw, citrus peels. Such feedstocks may contain other components such as protein, ash, and fats.

In some embodiments, the fermentation effluent of broth containing the carboxylic acids or the salts of the carboxylic acids (if the pH is above 6 it will be mostly salts) is then further cleaned up to remove undigested solids using liquid/solid separator such as, but not limited to a centrifuge or a filter/filter press. Further, finer suspended solids may be removed using membranes, such as, but not limited to nanofiltration, ultrafiltration or microfiltration. The concentration of the carboxylic acid salts may then be increased by removing water using processes such as, but not limited to, reverse osmosis or evaporation. The clean, concentrated fermentation effluent containing the carboxylic acid salts is sent to the carboxylic acid extraction process (CARS) to recover and purify the carboxylic acids from the aqueous fermentation effluent. The purified carboxylic acids may then be fractionated, using processes such as, but not limited to distillation, to produce pure individual acids.

In some embodiments, the pure individual acids or the mixed carboxylic acids prior to fractionation are reacted with glycerol to effect esterification. Catalysts that can be used, but are not limited to, are lipase enzymes, acids, solid acids catalysts, alkalis such as, but not limited to potassium hydroxide or sodium hydroxide, and other salts. Temperature range for this esterification could range from 30° C. to 250° C. The reaction is slow and may take several hours (from 2 to 10 hours) to ensure a high tri-esterification to produced triglycerides. Further, the product stream from this tri-esterification may be purified using steam vacuum distillation or molecular distillation to remove unreacted acids and water, which can be recycled to CARS or to fermentation. The products may be short-(C2 through C5 chain length acids) or medium-chain (C6 through C9) triglycerides, or combinations thereof.

In some embodiments, the pure individual acids or the mixed carboxylic acids prior to fractionation are reacted with oils, butters and other fats, such as but not limited to coconut oil (virgin or just the medium-chain fatty acids), sunflower oil, avocado oil, olive oil, canola oil, soybean oil, palm oil, fish oil and shea butter to effect transesterification. Catalysts that can be, but are not limited to, lipase enzymes and methoxides or ethoxides of sodium or potassium. Further, the product stream from this transesterification may be purified using steam vacuum distillation or molecular distillation to remove unreacted acids, water, which can be recycled to CARS or to fermentation. The products are structured lipids, where some of the short- or medium-chain fatty acids are now occupying some of the functional groups of the glycerol chain from the original oil, butter or other fats.

In some embodiments, after short- or medium-chain triglycerides (SCTs or MCTs), or combinations thereof have been produced as described above using tri-esterification, these SCTs or MCTs are further reacted with oils, butters and other fats, such as but not limited to coconut oil (virgin or just the medium-chain fatty acids), sunflower oil, avocado oil, olive oil, canola oil, soybean oil, palm oil, fish oil and shea butter to effect interesterification. Catalysts that can be, but are not limited to, lipase enzymes and methoxides or ethoxides of sodium or potassium. Temperature range for this interesterification could range from 30° C. to 120° C. The reaction is faster than esterification and can take 1 to 5 hours. Further, the product stream from this tri-esterification may be purified using steam vacuum distillation or molecular distillation to remove unreacted triglycerides, water, which can be recycled to CARS or to fermentation, or perhaps even be recycled back to the interesterification step. The products are structured lipids, where some of the short- or medium-chain fatty acids are now occupying some of the functional groups of the glycerol chain from the original oil, butter or other fats. In some embodiments the structured lipids have very high short-chain fatty acid (SCFA) content, which is not typically found in natural oil, butter and other fats in significant quantities. The SCFA content can be higher than 10%, higher than 20% and even higher than 30% on a mole basis.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method comprising:
    reacting carboxylic acids with glycerol in a direct esterification reaction in the presence of a catalyst to produce triglycerides in an esterification product stream, wherein the carboxylic acids are obtained from a fermentation or from a carboxylic acid recovery process associated with the fermentation and wherein the catalyst comprises an acid catalyst, a base catalyst, an enzyme catalyst, or a combination of any two or more thereof;
    purifying the esterification product stream to produce a purified product stream comprising triglycerides and a byproduct stream comprising unreacted carboxylic acids and salts thereof;
    recycling at least a portion of the byproduct stream to at least one of the fermentation or the carboxylic acid recovery process; and
    interesterifying the triglycerides with an oil, butter, fat, or other lipids in the presence of an enzyme as catalyst to produce structured lipids, wherein the enzyme is selected to promote metathesis reactions.

2. The method of claim 1, wherein the carboxylic acids are C2-C5 short-chain fatty acids, thus producing short-chain triglycerides.

3. The method of claim 1, wherein the carboxylic acids are C6-C9 medium-chain fatty acids, thus producing medium-chain triglycerides.

4. The method of claim 1, further comprising purifying the structured lipids to remove unreacted triglycerides.

5. The method of claim 4, wherein the purification of the structured lipids is performed by vacuum distillation, vacuum steam distillation, molecular distillation, or combinations thereof.

6. The method of claim 1, further comprising purifying the structured lipids to remove unreacted triglycerides.

7. The method of claim 6, wherein the purification of the structured lipids is performed by vacuum distillation, vacuum steam distillation, molecular distillation, or combinations thereof.

8. The method of claim 1, wherein the fermentation is a mixed-culture fermentation or an anaerobic digestion.

9. The method of claim 1, wherein the catalyst comprises an acid catalyst.

10. The method of claim 1, wherein the catalyst comprises a base catalyst.

11. The method of claim 1, wherein the catalyst comprises an enzyme.

12. The method of claim 1, further comprising utilizing the purified product stream to produce a nutritional additive or dietary supplement.

13. The method of claim 1, wherein the carboxylic acids comprise >90% biobased carbon as measured by ASTM D6866-20.

14. The method of claim 1, wherein the oil, fat or lipid is virgin coconut oil, medium-chain fatty acids derived from coconut oil, sunflower oil, avocado oil, olive oil, canola oil, soybean oil, palm oil, fish oil, shea butter, or combinations of any two or more thereof.

* * * * *